(12) United States Patent
Heil

(10) Patent No.: US 8,230,066 B2
(45) Date of Patent: Jul. 24, 2012

(54) LOCATION INDEPENDENT BACKUP OF DATA FROM MOBILE AND STATIONARY COMPUTERS IN WIDE REGIONS REGARDING NETWORK AND SERVER ACTIVITIES

(75) Inventor: Jochen Heil, Ladenburg (DE)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 10/690,014

(22) Filed: Oct. 21, 2003

(65) Prior Publication Data
US 2004/0122832 A1 Jun. 24, 2004

(30) Foreign Application Priority Data

Nov. 4, 2002 (EP) .................................. 02102530

(51) Int. Cl.
*G06F 15/173* (2006.01)
*G06F 3/00* (2006.01)
*G06F 5/00* (2006.01)
(52) U.S. Cl. .......................................... 709/226; 710/43
(58) Field of Classification Search .......... 709/208–219; 707/204; 714/2
See application file for complete search history.

(56) References Cited

U.S. PATENT DOCUMENTS

| | | | | | |
|---|---|---|---|---|---|
| 5,220,674 | A | * | 6/1993 | Morgan et al. | 709/223 |
| 5,778,165 | A | * | 7/1998 | Saxon | 714/4 |
| 5,838,911 | A | * | 11/1998 | Rosenhauer et al. | 709/203 |
| 6,101,445 | A | * | 8/2000 | Alvarado et al. | 702/9 |
| 6,397,249 | B1 | * | 5/2002 | Cromer et al. | 709/224 |
| 6,452,692 | B1 | * | 9/2002 | Yacoub | 358/1.15 |
| 6,466,967 | B2 | * | 10/2002 | Landsman et al. | 709/203 |
| 6,504,825 | B1 | * | 1/2003 | Atkins et al. | 370/254 |
| 6,519,053 | B1 | * | 2/2003 | Motamed et al. | 358/1.16 |
| 6,529,996 | B1 | * | 3/2003 | Nguyen et al. | 711/114 |
| 6,552,813 | B2 | * | 4/2003 | Yacoub | 358/1.1 |
| 6,564,336 | B1 | * | 5/2003 | Majkowski | 714/4 |
| 6,591,297 | B1 | * | 7/2003 | Challener et al. | 709/224 |
| 6,623,527 | B1 | * | 9/2003 | Hamzy | 715/234 |
| 6,631,477 | B1 | * | 10/2003 | LeCrone et al. | 714/5 |
| 6,671,724 | B1 | * | 12/2003 | Pandya et al. | 709/226 |
| 6,701,845 | B2 | * | 3/2004 | Ohmura | 101/484 |
| 6,704,885 | B1 | * | 3/2004 | Salas-Meza et al. | 714/6 |
| 6,742,092 | B1 | * | 5/2004 | Huebsch et al. | 711/162 |

(Continued)

FOREIGN PATENT DOCUMENTS

EP 0 899 662 A1 3/1999

*Primary Examiner* — David England
(74) *Attorney, Agent, or Firm* — Schmeiser, Olsen & Watts; John Pivnichny

(57) ABSTRACT

The present invention relates to a computerized method and respective system for servicing a request for a networked data transfer from a client system, which is able to be serviced on a particular server system being a member of a plurality of server systems dedicated to service said client requests, in which the server systems are connected via a network and share information about a plurality of client systems, and in which the service is known to consume some non-negligible network bandwidth. In order to balance required bandwidth peaks and to improve user comfort, it is proposed to establish an inter-server communication, which determines the best suited server for providing the service, reflecting pre-collected client history data, favorite service provision times, etc. The method can be applied primarily for backup of data from distributed client systems, or for improving print services.

15 Claims, 4 Drawing Sheets

U.S. PATENT DOCUMENTS

| | | | |
|---|---|---|---|
| 6,762,852 B1* | 7/2004 | Fischer | 358/1.15 |
| 6,847,984 B1* | 1/2005 | Midgley et al. | 1/1 |
| 6,886,035 B2* | 4/2005 | Wolff | 709/219 |
| 6,987,580 B2* | 1/2006 | Watanabe et al. | 358/1.15 |
| 6,993,558 B2* | 1/2006 | Yokokura | 709/203 |
| 7,081,969 B1* | 7/2006 | Motamed et al. | 358/1.16 |
| 7,099,928 B2* | 8/2006 | Aoki et al. | 709/217 |
| 7,127,535 B1* | 10/2006 | Huebsch et al. | 710/52 |
| 7,130,890 B1* | 10/2006 | Kumar et al. | 709/218 |
| 7,190,467 B2* | 3/2007 | Simpson et al. | 358/1.1 |
| 7,199,893 B2* | 4/2007 | Uchiyama et al. | 358/1.15 |
| 7,256,911 B2* | 8/2007 | Takabayashi et al. | 358/1.9 |
| 7,298,511 B2* | 11/2007 | Lay et al. | 358/1.15 |
| 7,415,435 B1* | 8/2008 | Weiss et al. | 705/37 |
| 7,574,546 B2* | 8/2009 | Keeney et al. | 710/220 |
| 7,584,223 B1* | 9/2009 | Pinkas et al. | 1/1 |
| 7,861,172 B1* | 12/2010 | Minagawa | 715/735 |
| 2001/0013053 A1* | 8/2001 | Yamazaki | 709/203 |
| 2001/0022913 A1* | 9/2001 | Ohmura | 400/76 |
| 2001/0029531 A1* | 10/2001 | Ohta | 709/223 |
| 2002/0048037 A1* | 4/2002 | Carbone | 358/1.14 |
| 2002/0102965 A1* | 8/2002 | Mandahl et al. | 455/412 |
| 2002/0103697 A1* | 8/2002 | Lockhart et al. | 705/14 |
| 2002/0103772 A1* | 8/2002 | Chattopadhyay | 705/412 |
| 2002/0147733 A1* | 10/2002 | Gold et al. | 707/200 |
| 2002/0174139 A1* | 11/2002 | Midgley et al. | 707/204 |
| 2003/0002072 A1* | 1/2003 | Berkema et al. | 358/1.15 |
| 2003/0014651 A1* | 1/2003 | Strobel et al. | 713/189 |
| 2003/0069972 A1* | 4/2003 | Yoshimura et al. | 709/226 |
| 2003/0074378 A1* | 4/2003 | Midgley et al. | 707/204 |
| 2003/0100307 A1* | 5/2003 | Wolochow et al. | 455/440 |
| 2003/0126250 A1* | 7/2003 | Jhanji | 709/223 |
| 2003/0220835 A1* | 11/2003 | Barnes, Jr. | 705/14 |
| 2004/0080783 A1* | 4/2004 | Owen et al. | 358/1.15 |
| 2004/0122832 A1* | 6/2004 | Heil | 707/100 |
| 2004/0125401 A1* | 7/2004 | Earl et al. | 358/1.15 |
| 2004/0220980 A1* | 11/2004 | Forster | 707/204 |
| 2005/0259682 A1* | 11/2005 | Yosef et al. | 370/468 |
| 2006/0120282 A1* | 6/2006 | Carlson et al. | 370/229 |
| 2006/0190598 A1* | 8/2006 | Cabrera et al. | 709/224 |
| 2006/0221380 A1* | 10/2006 | Pretz et al. | 358/1.15 |
| 2007/0121141 A1* | 5/2007 | Takabayashi et al. | 358/1.9 |
| 2008/0281968 A1* | 11/2008 | Rodriguez | 709/226 |

* cited by examiner

410: CLIENT PROFILE

| ID | HOME SERVER | GEO-LOC. | FAV. TIME | AMOUNT OF kB | MAX. LOC. SPEED AVAILABLE | MIN. SPEED REQUIRED |
|---|---|---|---|---|---|---|
| CL 3 | | | 411 | 412 | | |
| ■ ■ | | | | | | |
| CL X | | | | | | |

420: SERVER PROFILE

| ID | HOME CLIENT IDs | GEO-LOC. | POOL SPEEDS | CURRENT USAGE % | ACTIVITY SCHEDULE... |
|---|---|---|---|---|---|
| S 1 | | | | 422 | 424 |
| ■ ■ | | | | | |
| S Y | | | | | |

430: DATAPOOL PROFILE

| ID | HOME SERVER IDs | GEO-LOC. | POOL SPEED | MAX. No. OF PAR. ACCESS | No. OF CURR. FREE ACCESSES |
|---|---|---|---|---|---|
| P 1 | | | | | |
| ■ ■ | | | | | |
| P Z | | | | | |

440: BACKUP JOB PROFILE

| ID | CLIENT ID | GEO-LOC. | POOL ID | CONTENT INFO | TIME | INCR/TOTAL/ INC:/ EXCL. OPEN FILES |
|---|---|---|---|---|---|---|
| J 1 | | | | | | |
| ■ ■ | | | | | | |
| J N | | | | | | |

FIG. 4

LOCATION INDEPENDENT BACKUP OF DATA FROM MOBILE AND STATIONARY COMPUTERS IN WIDE REGIONS REGARDING NETWORK AND SERVER ACTIVITIES

FIELD OF THE INVENTION

The present invention relates to a computerized method and respective system for servicing a request for a networked data transfer from a client system, which is able to be serviced on a particular server system being a member of a plurality of server systems dedicated to service said client requests, in which the server systems are connected via a network and share information about a plurality of client systems, and in which the service is known to consume some non-negligible network bandwidth.

DESCRIPTION AND DISADVANTAGES OF PRIOR ART

An example for a prior art method and system as mentioned above is given in European patent EP 0 899 662. In particular, a backup and restore system for a computer network is disclosed there, in which multiple clients and multiple servers are connected via a local area network (LAN) to a backup file server. Each client and each server is provided with backup agent software which schedules backup operations on the basis of time since the last backup, the amount of information generated since the last backup, or the like. An agent also sends a request to the backup server, prior to an actual backup including information about the files that it intends to backup.

The backup server in this prior art system is provided with a mechanism, in order to receive backup requests from a plurality of client agents and to accept or reject backup requests on the basis of backup server loading, network loading, or the like. The backup server is further provided with mechanisms to enact redundant file elimination (RFE), whereby the server indicates to the client agents, prior to files being backed up, that certain of the files to be backed up are already stored by the backup server. Thus, the clients do not need to send the redundant files to be backed up.

This prior art backup concept via network also mentions a scenario with a plurality of two backup servers in the network. They may both be used for backup purposes. Detailed information for an improved backup strategy with a plurality of backup servers, however, is not disclosed.

Instead, this prior art backup concept is based on the approach that it is the client, which generates a request to initiate a backup operation, and to transmit the request to the backup apparatus, in response to a positive reply from the backup apparatus, in order to initiate the backup operation. The client thus schedules a backup operation and initially requests a backup "slot" which is allocated or denied by the backup apparatus. Further, it is proposed in this prior art document that the client further comprises means to confirm that anyone or more of the following parameters is within a respective predetermined threshold: the client loading, the backup apparatus loading, and the network loading. In case that, for some reason a backup operation is not possible, for example due to system or network loading access, the scheduling means may comprise a means for rescheduling a backup operation in the event, that an attempted to schedule a backup operation fails or is refused.

While this prior art offers some help for developing a good backup strategy in a local area network (LAN), it fails to support a scenario in which multiple clients and multiple backup servers are located in a quite large geographical region, for example spanning a whole country. In such scenario the clients may be connected only temporarily to the network, via a wireless connection having only a small bandwidth, as it is the case with a notebook user traveling around by car, train, or aircraft, who needs a backup of the freshly collected data to be done in a centralized form in order to assure for instance that the fresh data may be accessed from other stuff of his company, as well. In such scenario an automatic backup is difficult to organize because the bandwidth is small from time to time, dependent of the current geographical position and the constraint, to use a wireless connection which may be from time to time interrupted and is provided in most cases with only a very small bandwidth.

OBJECTIVES OF THE INVENTION

It is thus an objective of the present invention to provide a method and respective system for servicing a request for a networked data transfer, as mentioned above which is better adapted to dynamically varying network load, server load and client load.

SUMMARY AND ADVANTAGES OF THE INVENTION

This objective of the invention is achieved by the features stated in enclosed independent claims. Further advantageous arrangements and embodiments of the invention are set forth in the respective dependent claims. Reference should now be made to the appended claims.

Briefly, in order to balance required bandwidth peaks and to improve user comfort, it is proposed according to the invention, to establish an inter-server communication, which determines the best suited server for providing the service, reflecting pre-collected client history data, favorite service provision times, etc. The method can be applied primarily for backup of data from distributed client systems, or for improving print services.

It should be noted that the invention is embodied in computerized methods and systems, which are distributed in distinct computer systems within the network, in particular implemented on server systems and client systems. Thus, the method claims reflect this distributed nature of the invention.

According to its basic aspect a server-implemented software discloses a method for servicing a request for a networked data transfer from a specific client system out of a plurality of client systems being able to be serviced on a plurality of server systems, said server systems being connected via a network, and the service being known to consume some non-negligible network bandwidth in relation to network bandwidth available between a client and a server system, whereby the method is characterized by the steps of:

a) in case of a service needed to be provided for a particular client system, setting up a network connection between said client system and a server system, e.g., when receiving a service request from a client, or when a predefined trigger is activated at the client, etc. . . .

b) reading client-specific information relevant for servicing said request from a client profile managed and shared by said plurality of server systems, said information including client-specific history information about the network load associated with former requested services, c) determining the bandwidth currently available for the network connection between said client and said server in contact, d) determining the content of the client service request, for instance, in case of regularly repeated services by reading it from an activity schedule listing all scheduled services for a specific server, or by reading a service request description right from a respectively qualified request, e) in case, the determined bandwidth is lower than a predetermined threshold level, establishing an inter-server communication for collecting service performance data from at least a subset of said server systems, said service performance data describing:

aa) the current usage of said servers,
   bb) a respective current available network bandwidth between a respective server and said service requesting client system, and
   cc) server availability time periods, f) evaluating the collected performance data for making a decision, which one of the plurality of servers is the best suited for servicing said request, and g) initiating the servicing of said request to be performed by said best suited server system.

Preferably, a home server associated permanently with a subset of said client systems is provided at least for a first contact for said subset of clients. This helps to simplify the first contact for initiating a backup.

When further, said particular server is selected to be the best, which offers the best bandwidth for the service, and which has an available workload slot at a time, which is defined as a "favorite" servicing time at the client side, and automatically connecting said requesting client system to said best server system, then the advantage results that a second registration at a preferred server or at the home server is not required.

When the method further comprises the step of:
in case of a client system being contacted from said best suited server and the client not being available,
processing a request prematurely, which is stored on the activity schedule associated with said server, in order to fill unused time gaps for backup purposes.

Further, the service may also comprise the printing of data generated by clients at one or more of said plurality of server systems, which are arranged as printer servers.

According to its basic aspect an inventive client software discloses a method to be applied for a client system out of a plurality of client systems, for receiving a service from a server system, which is a member of a plurality of server systems dedicated to service client requests, said server systems being connected via a network and sharing information about the plurality of client systems, which method is characterized by the steps of:

a) if a need for a service is determined to be present for the client system, setting up a network connection between said client system and a server system, b) receiving the identification of the best suited server system for servicing the request.

Preferably, the service comprises the backup of data generated by clients to one or more of said plurality of server systems.

The inventive client-implemented method may preferably further comprise the steps of:

a) testing the currently available network bandwidth to a home server associated with said client system, b) sending a backup request to said server, in case the bandwidth is higher than a predetermined threshold level, and/or, if an amount of data exists at the client side for being backed up, which exceeds a predetermined threshold level.

The present invention offers in particular the following measures, in order to improve prior art method and systems:

Processing and dynamically adapting information about the usual behavior of clients, including geographical location information, working time, including online/offline time, and backup data amounts;

Setting up a connection between client and a backup server only, if a predetermined, guaranteed data transfer rate can be achieved;

Automatically anticipating a prescheduled backup job to be done at an earlier time, than prescribed in the schedule, in case a different backup job relating to a different client may not be performed currently, whereby time gaps are used for backup purposes, which remain unused in prior art. This helps to balance peaks in required network bandwidth.

By enabling a client to request autonomously an out-of-schedule automatic backup, if a predetermined threshold value for freshly generated data is exceeded, a significantly higher probability is reached to establish client server connections having a data transfer rate which is adapted to the physical maximum facilities at the client side.

A respective restore process may be summarized as follows:

First, a connection is established preferably to the home server by a client system. If the server load of this server is currently too large, the next free server having a current lower load may also be contacted. In case, the backed up data is stored in several chunks distributed at several locations within the network, because not or not yet collected at one or a small plurality of centralized data pools, preferably that data is fetched first, which resides at the nearest data pool having currently the most quick access. During the transfer of this restore data to the client system, the next data transfers are established from respective more remote residing data to said client-contacted, service providing restore server, in order to enable it to service the entire restore request without major time gaps, interruption, or any other no-desired delay.

BRIEF DESCRIPTION OF THE DRAWINGS

The present invention is illustrated by way of example and is not limited by the shape of the figures of the drawings in which:

FIG. 4 is a block diagram representation showing essential attributes of a client profile (top), of a server profile (next below), of a data pool profile (further below), and a backup job profile (bottom), managed in respective data bases and storing and offering the information needed when performing the inventive embodiment of backup processes.

DETAILED DESCRIPTION OF THE PREFERRED EMBODIMENT

Figure 1:
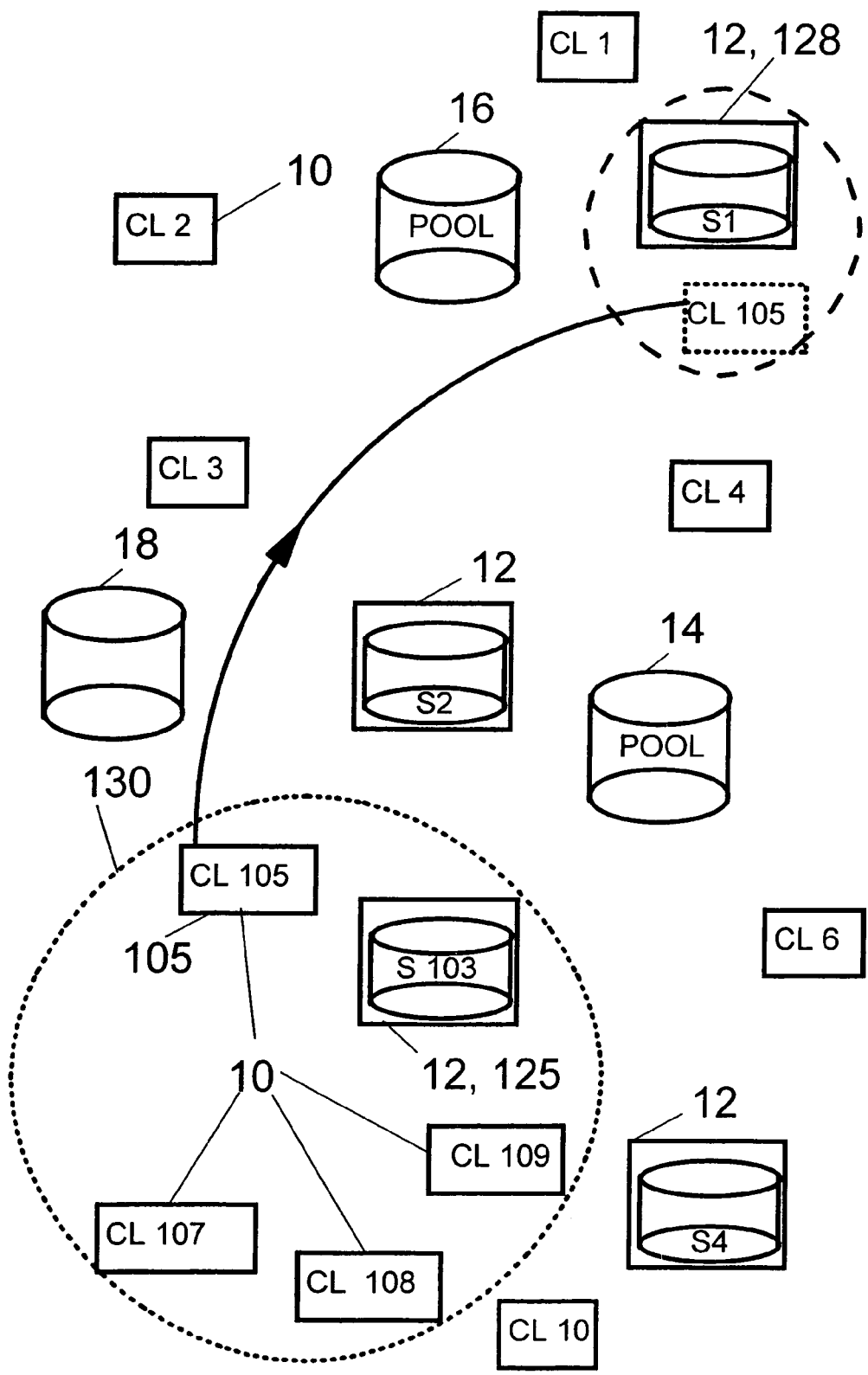
FIG. 1 is a schematic block diagram representation illustrating the basic components, which participate in the inventive method.

With general reference to the figures and with special reference now to FIG. 1 a plurality of client systems 10, depicted as CL1, CL2, ..., CL10 symbolizes a respective number of mobile or fixedly installed desktop computers in a wide area network, interconnected via a LAN/WAN Intranet including wire connections and wireless connections. Client system 105 (CL5) is hereby assumed as a notebook computer belonging to a person traveling around within the WAN geographic region, assumed to be quite large, for instance a country such as Germany. Said client systems are assumed to be backed up in more or less regular time intervals.

For this purpose, a set of backup servers 12, 125, 128 (denoted as S1, S2, S103 and S4) is provided within the Intranet. The backup servers are connected to two similarly structured data pools 14, 16, into which the backup data is stored. For this purpose, high bandwidth connections exist between each of the servers and each of the data pools. As the network connections between the system elements are large in number, they are not depicted in the drawing, in order to increase clarity thereof. Also, the number of clients and servers used in this illustrative example is willingly held small, in order to increase clarity of the drawing.

In this scenario all servers may access all data of all client systems. A particular server system 125 (denoted as S103) is depicted to be associated permanently with a subset of said client systems, which are client systems 105, 107, 108 and 109. Such preferred association is provided to give a simple, fixed initial contact address for those client systems. This preferred server 125 is a home server for those client systems, because it is assumed that the client systems are located geographically very close to said server S103. This association may, however, be modified and replaced dynamically by another one, if ever required, which might be the case when for example a client very often connects from another location, which is connected to a server located in turn much nearer than its actual home server. Then the nearer server is dynamically chosen as a current home server, and the former home server is a subordinated server, as it is the remaining rest of servers.

According to the present invention the usual behavior of said clients 10 (CL1, . . . CL10, CL 105, . . . CL109) is stored in a centralized client database 18, which may be accessed by all of said backup servers S1, . . . S5.

According to this inventive embodiment and with additional reference to the top part in FIG. 4, a typical client profile stored therein comprises a client ID, all server IDs including a home server ID, an attribute describing the geographic location of a client, a favorite time span, during which the client system is connected online into the network, and in which a backup of data generated locally at the client may be considered as useful, because for example, the major part of freshly processed files are closed and ready for backup.

Further, the client profile comprises the amount of data (Kilobyte, Megabyte), which describes the usual amount of backup data, backed up within a given history time span, further, a maximum data transfer rate (speed), which may be provided by the client and which may represent a bottleneck for an intended network data transfer, and a minimum speed, which is considered to be required for performing a reasonable backup of data from the client to anyone of the depicted server systems.

Further, an online/offline flag may be optionally provided therein, as well.

A table-like illustration of this client profile is given at the top portion of FIG. 4, to which reference is thus made. Thus, for example, the client ID may comprise a unique name and a TCP-IP address, the home server ID may be similar a nature, the geographic location may be a character string denoting a city, favorite time may be stored as between 4 and 6 p.m., the amount of transfer data may be denoted as 20 Megabytes, the maximum local speed which is available at the client may be 56 Kilobits per second, the minimum speed required may be 10 Kilobits per second.

Thus, a home server is provided with an activity schedule in order to satisfy the backup needs of its home clients, which may be implemented in the form of a table, as well. An entry of this table may comprise a client ID accompanied with a preferred backup initialization time.

Figure 2:
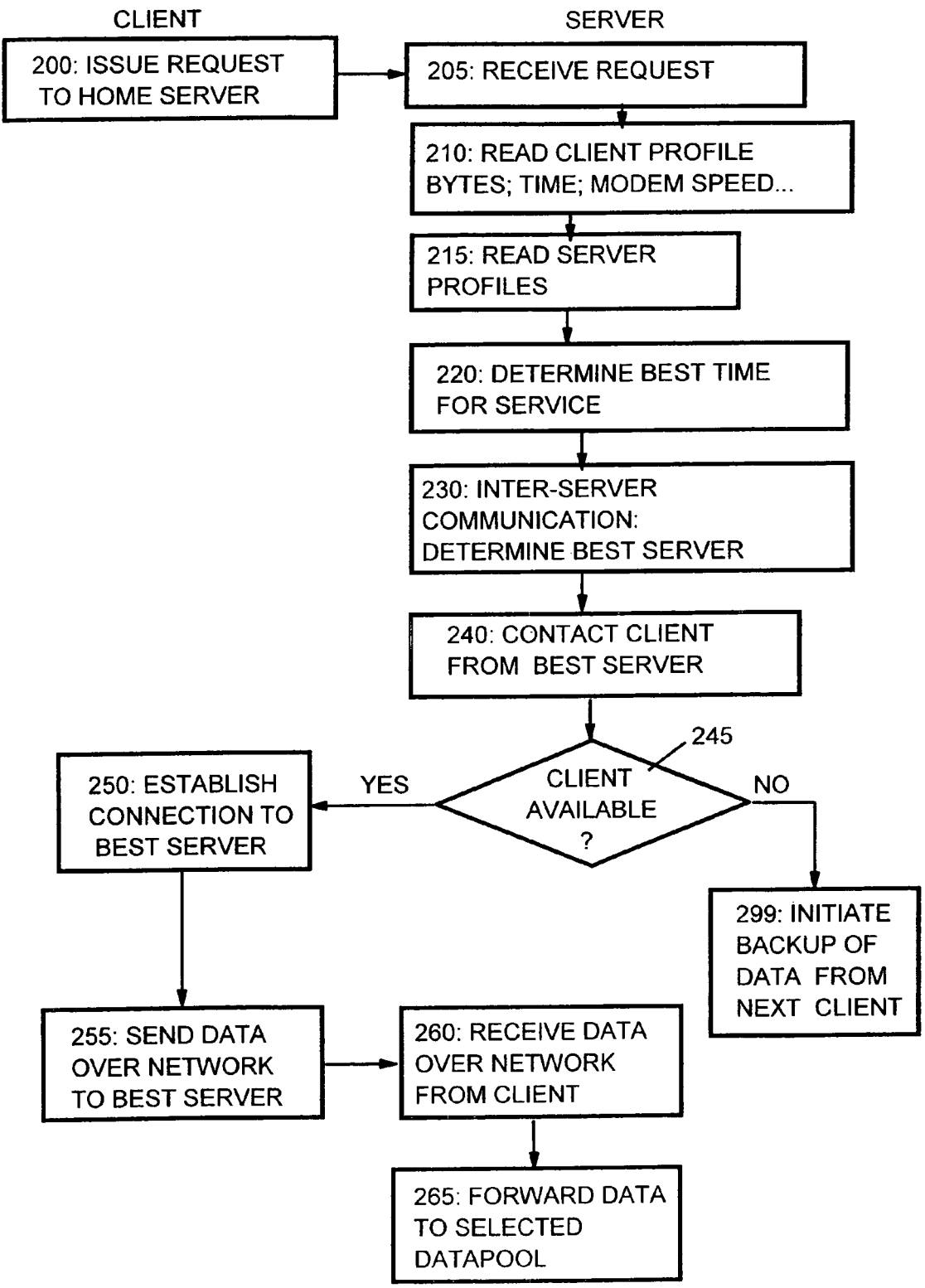
FIG. 2 is a schematic block diagram representation illustrating the basic control flow of the inventive method applied to improve backup processes within a wide area network (WAN), including wireless communications.

With further reference to FIG. 2 an inventive embodiment of the control flow of the inventive concept will be described in more detail below. In the left column of FIG. 2 the client activities are depicted, in the right hand column the server activities are depicted.

In a first step 200 client 105 is assumed to issue a request for backup to its home server 125, which receives this request in step 205. Optionally, such request may only be issued, if a preceding bandwidth test done by client 105 yields, that the bandwidth between client 105 and server 125 is higher than a predetermined threshold level, as e.g. 40 Kilobit per second, as client 5 is assumed to be a notebook having only a modem device with a maximum local speed of 56K, this is a reasonable value.

Client 5 is assumed to be on travel during the major part of this time. This is symbolized with the curved arc in FIG. 1. Client 105 is assumed now to be geographically very close to server 128 and concurrently very far away from its original home server 125.

According to the present inventive embodiment the backup is preferably done in an optimized way, which reflects the possibility of using the very close server system 128 for backup purposes instead of using the original home server 125, in particular, when the bandwidth from the client to the close server system 128 is significantly better than that to home server 125, and if server 128 has a respective free capacity for servicing the intended backup request.

This is preferably achieved, as follows:

In a next step 210 the contacted home server 125 first accesses the client database 18 and reads from the respective entry 410 preferably the information given for the intended backup job, as are: amount of bytes, favorite time, maximum modem speed limited by the client facilities, and the status field, saying if the client is still online or offline. This information is referred to herein as "job or service description". Further, server 125 accesses database 18, which also holds server status information, in order to compare the server information given there and find out, which server would be the best for servicing the client request.

Figure 3:
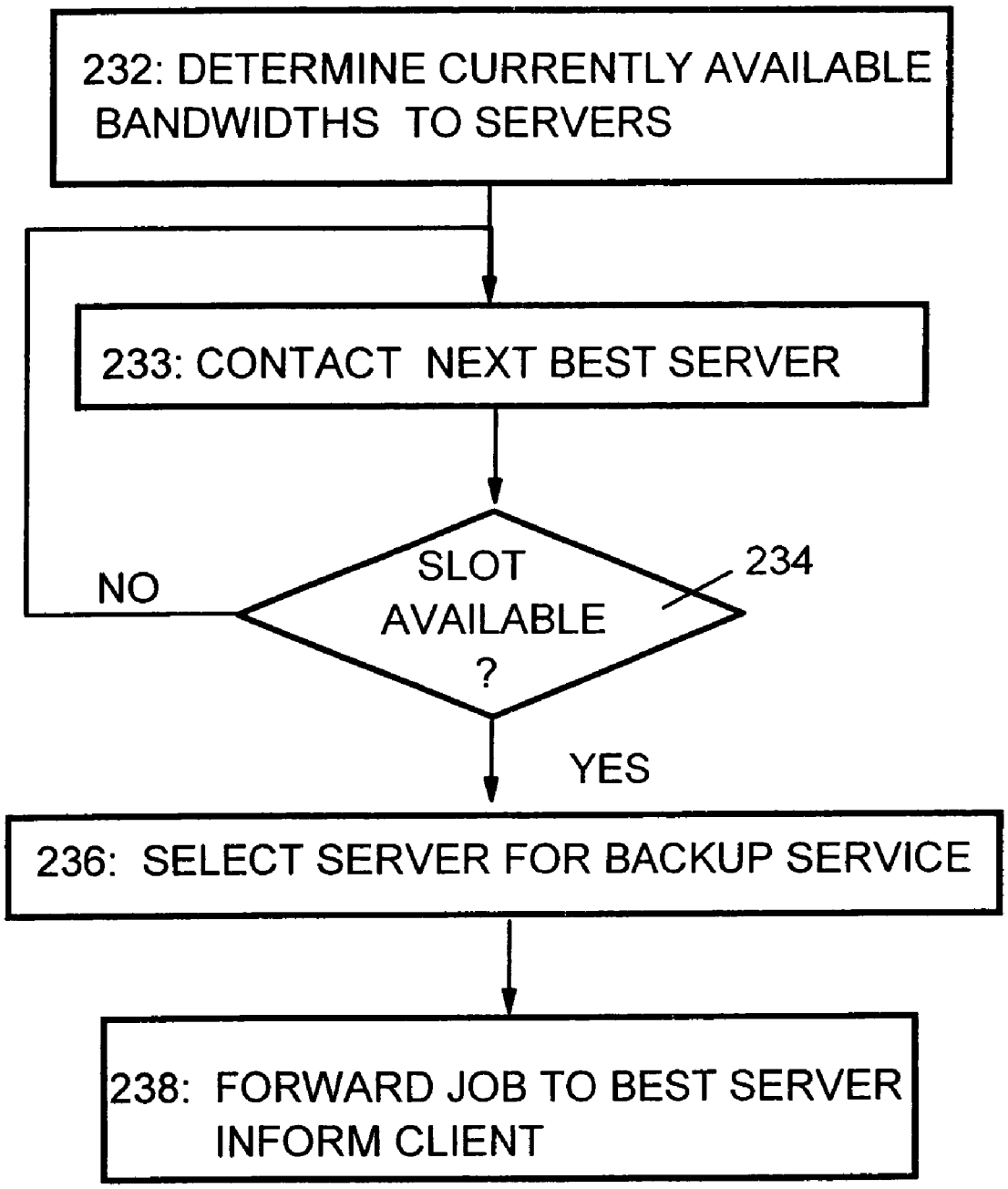
FIG. 3 is a detail view relating to step 230 of FIG. 2.

Thus, in a block 230, a so-called inter-server communication is initialized by home server 125, in order to determine the best server for doing the backup job, i.e. service, requested by said client 105. Details of this determination process are given in FIG. 3, to which reference should now be made.

In a first step 220 it is checked, if the current time is within the range defined as favorite time and stored in the client entry of said database 18. If this is the case, in step 232, the currently available bandwidths are measured by test messages between client 105 and each of the backup servers 12. For this technical task, prior art technology may of course be used. As the client is provided with any of the relevant server IDs, it may autonomously perform this bandwidth measurement. Then, the results of these measurements are transferred to the home server in the form of a ranked list specifying the server having the best bandwidth as the particular backup server.

It may now be assumed, that the bandwidth for server S1, having reference sign 128 is currently the best-connected server. This is expressed in FIG. 1 by the circle around client 105 and server S1 in the top right area of the drawing.

Then, said home server, to which the measurement result list was transferred, processes this list, beginning with the best server, i.e. server S1: In step 233, the server S1 218 is contacted and asked, if there is a work slot available, during which the intended backup may be done, or not. Preferably, some time window is enclosed in this asking, specifying a time range between now and a predetermined latest time, during which the job should be performed in order to be ranked best. In this example, said time range may be assumed to be between 4:30 and 5:30 p.m. In case, a work slot is available at the best server, a request for backup is filed in the respective queue thereof, whereby said best-suited server is selected for providing the backup service, step 236.

Otherwise, see the NO-branch of the respective decision 234 it is branched back to step 233 in order to repeat the foregoing asking procedure specifying the same job description at the next server, ranked as second best server. This procedure is repeated until a server is found. If no server is found to service the backup request, the home server is selected preferably as a default server. As soon as decision 234 is done, this is reported to client 105 and to the selected server 128. Such order confirmation preferably includes the estimated time range, during which said client system 105 should necessarily be hold online in order to perform the backup process.

With reference back to FIG. 2 in a next step 240 client system 105 is contacted from the best server, selected in step 236, as described above. This is preferably done according to prior art queue management at the best server. In case, client 105 is switched online, the backup process may begin. Thus, see the YES-branch of decision 245, the connection between client 105 and server 128 is established, and client 105 sends the data to be backed up over the network to the selected best server 128, step 255. Said server 128 receives the data, see step 260, and buffers it, in order to forward it preferably asynchronously to its preferred data pool 14 or 16, see back to FIG. 1, as known from prior art. When all data is received from client 105, the connection is closed, and the backup server 128 deletes client 105 from its queue, step 265.

In case a client is not available in the checking step 245, FIG. 2, an automatic backup of a different client may be performed prematurely relative to a normal, prescheduled backup start time, in order to avoid later server load or network load peaks, in case a plurality of backup jobs would coincide at a later point in time, see step 299.

With reference to FIG. 4 additional information is given specifying a server profile as already referred to above, a data pool profile, and a backup job profile, which are maintained in said database 18 with open access for all backup servers.

A server profile comprises a server ID, a plurality of IDs, each associated with a client, relative to which a respective server is considered as a home server, a geographical location field, a field specifying a plurality of data transfer rates achievable between the server and a respective data pool, 14 or 16, a field storing the current usage of a server, which tells if and how much capacity is free at a server for doing some backup job, and an activity schedule, as mentioned already further above, comprising a list prescheduled jobs including each a client ID and a preferred job initialization time. Thus, in case the current usage field shows a percentage around 100%, it may be derived that it is better to contact a different server having may be a lower value of current usage in above step 240. Also, the activity schedule list enables for determining if there is a working slot available in decision 234 for doing a backup job specified in a given job description, i.e. amounts of bytes to be transferred, and measured bandwidth.

With further reference to FIG. 4, a data pool profile comprises generally a data pool ID, a list of—optionally home—server IDs, a geographic location, a maximum number of theoretically feasible, parallel accesses to respective parallel backup media devices, and the current number of free, parallel access possibilities. Thus, in case if said last number of free accesses is zero, there is no free capacity for performing a backup process.

Further, with reference to the bottom part of FIG. 4 a typical backup job profile comprises a job ID, a respective client ID, saying from which client the data is taken, a data pool ID, saying at which data pool 14, 16 data is resident, a content info field describing a logical description of the backup process, possibly specifying absolute path names of a file system, etc., the amount of transferred data, the amount of backed up data, if ever a difference may exist, etc., further a time stamp associated with the backup process, and further information describing the nature of the backup process, for instance if the backup is a total backup or an incremental backup including or excluding open files, etc. For this section of technology, one may refer to prior art, as well.

As reveals from the above description the present invention provides an improved method system for the backup of data, which includes location independent backup of data from either mobile or stationary computers, which covers wide regions and which regards network as well as server activities. In particular, dynamically changing load peaks either in server machines or network loads can be treated quite flexibly, and pure data transfer rates accompanied with long backup times may often be avoided according to the invention.

A further preferred embodiment of the present invention comprises the printing of data, which is generated by above clients 10, 105, see back to FIG. 1 at one or more of a plurality of server systems 12, 125, 128, which are arranged as printer servers in a local area network, or in a publicly available network. In this second embodiment a client-initiated print request will be serviced in a way, which is improved by the present invention.

Said print request, which is basically comparable to a backup request, as far as network and device loads are concerned, comprises firstly the usual content and control data, which are used in prior art network printing technology, primarily the address of the desired printer. Furthermore, the print request comprises specifically some information specifying the degree of necessity that a print job is done at the desired printer. For instance this degree may be implemented in a 4-value scale:

0=forcedly one printer, possibly taking in account some service provision time delay, 1=desired by the user, but not forcedly limited to the desired printer, 2=free choice within a given subset of available printers, where a subset may be formed of the plurality of printers available within one single building, for example, 3=absolutely free choice;

Of course, other scales disclosing various different values and attributes may be useful in this regard, a decision which depends of the respective business environment. This may preferably include the provision for situations, in which a user wishes to issue a print job, which is targeted and thus dedicated to a different person, located elsewhere in the network, who is intended to pick up the printout of the print job.

Further parameters of the print request are:

The desired printing quality,

Selection of paper type (ecological, representative, formal letter, photo-sensitive surface, . . . ), Selection of paper size, format, etc., Urgent/not urgent, maximum of user-accepted service response time, possibly, overnight job accepted, etc.

Such print request parameter is recorded in the print job profile.

Further, the inter-server communication is used in this embodiment for determining the best suited printer device for the request. The client-specific history information in this print job embodiment may for instance tell something about the usual printing practices issued by a user. This information may advantageously be evaluated in order to concentrate the printouts originating from a given time span (e.g., 2 hours) at one single location, or at a few locations, which are located near to each other, in order to avoid too much waste of time necessary otherwise to collect the printout, after the jobs have completed. The client profile, the server profile, and the printer profile are adapted specifically in order to reflect the specific properties of the printing embodiment. The printer device itself corresponds to the data pool in the preceding embodiment. For instance, the pool speed in FIG. 4 of the data pool profile can be replaced by the printing speed of a printer device, e.g., 10 pages per minute. As a printer is usually a device, which processes jobs serially one after the other, the current queue length (number of pages) should be incorporated in the printer profile. Further, the spool data, sent via network, corresponds to the data to be backed up in the preceding embodiment. Further, no attention needs to be provided to a restore process, which is not comprised in the printing analogue discussed here, as the printing is a one-way affair, except the sending back of error or delay messages.

The present invention can be realized in hardware, software, or a combination of hardware and software. A printing or backup/restore tool according to the present invention can be realized in a centralized fashion in one computer system, or in a distributed fashion, where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product comprising a computer readable storage medium, which comprises all the features enabling the implementation of the methods described herein, and which—when loaded in a computer system and executed by a processor of the computer system—is able to carry out these methods. The storage medium is hardware.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

What is claimed is:

1. A method for servicing a print request from a specific client system of a plurality of client systems, said print request being able to be serviced on a plurality of printer server systems, said printer server systems being connected via a network, said method comprising:

in response to receiving said print request from said specific client system, setting up a network connection between said specific client system and the plurality of printer server systems;

reading, from a database accessible to each printer server system, client-specific information from a client profile, printer server information from a server profile, and printer information from a printer profile, wherein said client-specific information pertains to the specific client system, wherein the printer server information pertains to each print server system of the plurality of printer server systems, and wherein the printer information pertains to a plurality of printers utilized by said printer server systems;

ascertaining at least one best-suited printer of the plurality of printers to be used for servicing said print request, wherein said ascertaining comprises utilizing said client-specific information, said printer server information, and said printer information; and in response to said ascertaining, servicing said print request, said servicing performed by said at least one best suited printer, wherein said client-specific information comprises:
server identifiers identifying each printer server system of the plurality of printer server systems, a home server identifier identifying which printer server system of the plurality of printer server systems is the specific client system's home server,
the specific client system's geographic location,
a favorite time span reflecting when the specific client system has previously been connected to the network,
an amount of data reflective of a quantity of data previously printed within a given historical time span,
a maximum data transfer rate at which the specific client system can transfer data to the network, and
a minimum speed required for printing data received from the specific client system by each printer server system of the plurality of printer server systems.

2. The method of claim 1, wherein said printer server information comprises:
each printer server system's geographic location,
a data transfer rate between each printer server system and a respective printer of the plurality of printers,
a current percent usage of each printer server system, and
an activity schedule of all services currently scheduled for each printer server system.

3. The method of claim 1, wherein said printer information comprises:
each printer's geographic location,
a printing speed of each printer,
a maximum number of pages of each printer's queue, and
a current number of pages currently in each printer's queue.

4. The method of claim 1, wherein said at least one best suited printer consists of a single printer of the plurality of printers.

5. The method of claim 1, wherein said at least one best suited printer comprises at least two printers of the plurality of printers, and wherein said servicing said print request comprises said at least two printers generating printed output required by said print request.

6. A computer program product, comprising a computer readable storage medium having program instructions stored therein, said storage medium being hardware, said program instructions configured to be executed by a computer processor of a computer system to implement a method for servicing a print request from a specific client system of a plurality of client systems, said print request being able to be serviced on a plurality of printer server systems, said printer server systems being connected via a network, said method comprising:

in response to receiving said print request from said specific client system, setting up a network connection between said specific client system and the plurality of printer server systems;

reading, from a database accessible to each printer server system, client-specific information from a client profile, printer server information from a server profile, and printer information from a printer profile, wherein said client-specific information pertains to the specific client system, wherein the printer server information pertains to each print server system of the plurality of printer server systems, and wherein the printer information pertains to a plurality of printers utilized by said printer server systems;

ascertaining at least one best-suited printer of the plurality of printers to be used for servicing said print request, wherein said ascertaining comprises utilizing said client-specific information, said printer server information, and said printer information; and in response to said ascertaining, servicing said print request, said servicing to be performed by said \at least one best suited printer, wherein said client-specific information comprises:
server identifiers identifying each printer server system of the plurality of printer server systems, a home server identifier identifying which printer server system of the plurality of printer server systems is the specific client system's home server,
the specific client system's geographic location,
a favorite time span reflecting when the specific client system has previously been connected to the network,
an amount of data reflective of a quantity of data previously printed within a given historical time span,
a maximum data transfer rate at which the specific client system can transfer data to the network, and
a minimum speed required for printing data received from the specific client system by each printer server system of the plurality of printer server systems.

7. The computer program product of claim 6, wherein said printer server information comprises:
each printer server system's geographic location,
a data transfer rate between each printer server system and a respective printer of the plurality of printers,
a current percent usage of each printer server system, and
an activity schedule of all services currently scheduled for each printer server system.

8. The computer program product of claim 6, wherein said printer information comprises:
each printer's geographic location,
a printing speed of each printer,
a maximum number of pages of each printer's queue, and
a current number of pages currently in each printer's queue.

9. The computer program product of claim 6, wherein said at least one best suited printer consists of a single printer of the plurality of printers.

10. The computer program product of claim 6, wherein said at least one best suited printer comprises at least two printers of the plurality of printers, and wherein said servicing said print request comprises said at least two printers generating printed output required by said print request.

11. A computer system, comprising a computer processor and a computer readable storage medium having program instructions stored therein, said storage medium being hardware, said program instructions configured to be executed by the computer processor to implement a method for servicing a print request from a specific client system of a plurality of client systems, said print request being able to be serviced on a plurality of printer server systems, said printer server systems being connected via a network, said method comprising:

in response to receiving said print request from said specific client system, setting up a network connection between said specific client system and the plurality of printer server systems;

reading, from a database accessible to each printer server system, client-specific information from a client profile, printer server information from a server profile, and printer information from a printer profile, wherein said client-specific information pertains to the specific client system, wherein the printer server information pertains to each print server system of the plurality of printer server systems, and wherein the printer information pertains to a plurality of printers utilized by said printer server systems;

ascertaining at least one best-suited printer of the plurality of printers to be used for servicing said print request, wherein said ascertaining comprises utilizing said client-specific information, said printer server information, and said printer information; and in response to said ascertaining, servicing said print request, said servicing to be performed by said at least one best suited printer, wherein said client-specific information comprises:
server identifiers identifying each printer server system of the plurality of printer server systems, a home server identifier identifying which printer server system of the plurality of printer server systems is the specific client system's home server,
the specific client system's geographic location,
a favorite time span reflecting when the specific client system has previously been connected to the network,
an amount of data reflective of a quantity of data previously printed within a given historical time span,
a maximum data transfer rate at which the specific client system can transfer data to the network, and
a minimum speed required for printing data received from the specific client system by each printer server system of the plurality of printer server systems.

12. The computer system of claim 11, wherein said printer server information comprises:
each printer server system's geographic location,
a data transfer rate between each printer server system and a respective printer of the plurality of printers,
a current percent usage of each printer server system, and
an activity schedule of all services currently scheduled for each printer server system.

13. The computer system of claim 11, wherein said printer information comprises:
each printer's geographic location,
a printing speed of each printer,
a maximum number of pages of each printer's queue, and
a current number of pages currently in each printer's queue.

14. The computer system of claim 11, wherein said at least one best suited printer consists of a single printer of the plurality of printers.

15. The computer system of claim 11, wherein said at least one best suited printer comprises at least two printers of the plurality of printers, and wherein said servicing said print request comprises said at least two printers generating printed output required by said print request.

* * * * *